(12) United States Patent
Truong et al.

(10) Patent No.: US 11,849,377 B1
(45) Date of Patent: Dec. 19, 2023

(54) ELECTRICAL PORT LABELING

(71) Applicant: INTERNATIONAL BUSINESS MACHINES CORPORATION, Armonk, NY (US)

(72) Inventors: Bryan Edward Truong, Raleigh, NC (US); Robert Wilhelm, Cheyenne, WY (US); Derek Brewer, Bowling Green, OH (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/664,947

(22) Filed: May 25, 2022

(51) Int. Cl.
*H04W 4/80* (2018.01)
*G06F 3/147* (2006.01)

(52) U.S. Cl.
CPC .............. *H04W 4/80* (2018.02); *G06F 3/147* (2013.01)

(58) Field of Classification Search
CPC ..................................................... H04W 4/80
See application file for complete search history.

(56) References Cited

U.S. PATENT DOCUMENTS

| | | | | |
|---|---|---|---|---|
| 7,091,853 | B2 * | 8/2006 | Pfleging | H04L 12/2818 |
| | | | | 379/102.01 |
| 9,967,152 | B2 * | 5/2018 | Funase | G06Q 10/06 |
| 10,536,361 | B2 * | 1/2020 | Frei | G06F 1/26 |
| 10,680,906 | B2 | 6/2020 | Funase | |
| 2009/0236909 | A1 * | 9/2009 | Aldag | H01R 25/142 |
| | | | | 340/654 |
| 2013/0338844 | A1 * | 12/2013 | Chan | G05B 13/02 |
| | | | | 700/286 |
| 2015/0236459 | A1 * | 8/2015 | Lee | H01R 25/003 |
| | | | | 439/652 |
| 2015/0256409 | A1 * | 9/2015 | Masuyama | H04L 41/12 |
| | | | | 370/254 |
| 2016/0044719 | A1 * | 2/2016 | Sidhu | H04W 68/00 |
| | | | | 370/329 |
| 2016/0242232 | A1 * | 8/2016 | Deros | H01R 31/065 |
| 2019/0109801 | A1 * | 4/2019 | Scarpin | H04W 4/80 |
| 2021/0083992 | A1 * | 3/2021 | Didear | H04L 45/64 |

(Continued)

OTHER PUBLICATIONS

Disclosed Anonymously, "Adjustable Low-Profile Sensor for a Merchandise Security Device", IPCOM000238521D, Publication date: Sep. 2, 2014, pp. 1-24.

(Continued)

*Primary Examiner* — David Bilodeau
(74) *Attorney, Agent, or Firm* — Tihon Poltavets (57) ABSTRACT

A method for displaying identification information for devices electrically coupled to a plurality of ports includes determining a first device is electrically coupled to a first port out of a plurality of ports. The method further includes establishing communications between a first communication transmitter on a first electrical connector for the first device and a first communication receiver associated with the first port. In response to determining first identification information is available for the first device, the method further includes receiving, from the first communication transmitter, at the first communication receiver the first identification information for the device. The method further includes displaying, in a first display, the first identification information for the first device, wherein the first display is associated with the first port.

20 Claims, 5 Drawing Sheets

(56) References Cited

U.S. PATENT DOCUMENTS

2021/0184409 A1* 6/2021 Li .................. H01R 13/7175
2022/0224772 A1* 7/2022 Narayanan ............ H04W 76/30

OTHER PUBLICATIONS

Disclosed Anonymously, "Exchangeable Smart Input/Output Modules of a Wireless Device Having a Constant Form Factor", IPCOM000130454D, Publication date: Nov. 9, 2005, pp. 1-5.
Disclosed Anonymously, "Method for a Dual Post-Code Alphanumeric Display Module", PCOM000008568, Publication date: Jun. 24, 2002, pp. 1-6.
Franklin, "Mobile Hotspot—User Manual", Revision: Rev. 1.0, Apr. 6, 2020, pp. 1-52.
Hach, "SC1000 Digital Controller—Modular System", http://www.hach.com/digital-controllers-transmitters/sc1000-controller . . . , accessed Feb. 25, 2022, pp. 1-4.
Wikipedia, "HomeKit", https://en.wikipedia.org/wiki/HomeKit, accessed Feb. 25, 2022, pp. 1-5.
Wikipedia, "HomePlug", https://en.wikipedia.org/wiki/HomePlug, accessed Feb. 25, 2022, pp. 1-8.

\* cited by examiner

ELECTRICAL PORT LABELING

BACKGROUND

This disclosure relates generally to electrical ports, and in particular, to labeling an electrical port based on identification information for a device connected to the electrical port.

Electrical ports, such as power outlets on a power strip, supply cabled power to each device that is connected to each of the electrical ports. For a professional or home office a single wall outlet can supply power to a power strip that includes various electrically connected devices including a personal computer, multiple monitors, input devices, telephone, and printer. Presently, to identify which cable is supplying power to which device, a user can trace a path for each cable between an electrical port on the power strip and a specific device to which the cable belongs.

SUMMARY

One aspect of an embodiment of the present invention discloses a method for displaying identification information for devices electrically coupled to a power strip, the method comprising determining a first device is electrically coupled to a first port out of a plurality of ports. The method further comprising establishing communications between a first communication transmitter on a first electrical connector for the first device and a first communication receiver associated with the first port. The method further comprising, responsive to determining first identification information is available for the first device, receiving, from the first communication transmitter, at the first communication receiver the first identification information for the device. The method further comprising displaying, in a first display, the first identification information for the first device, wherein the first display is associated with the first port.

Another aspect of an embodiment of the present invention discloses a system for displaying identification information for device electrically coupled to a power strip, the apparatus comprising a first communication receiver, a first display, and a first port configured to provide electrical current to a first electrically coupled device. The system further comprising a first electrical connector for the first electrically coupled device with a first communication transmitter configured to transmit first identification information for the first electrically coupled device to the first communication receiver for presentation in the first display.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
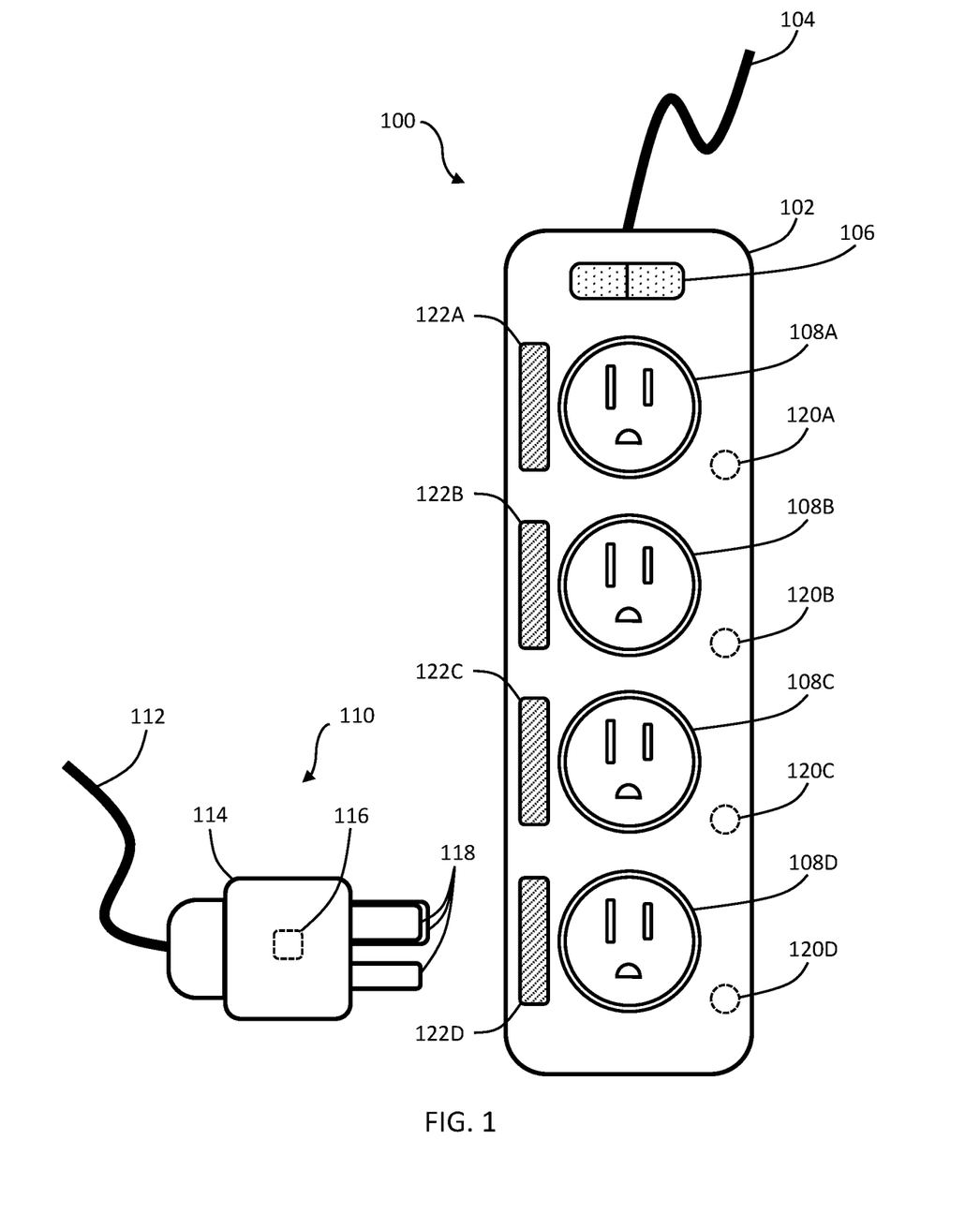
FIG. 1 depicts a top view of a power strip with multiple ports and an electrical connector for electrically coupling to a port, in accordance with an embodiment of the present invention.

FIG. 1 depicts a top view of a power strip with multiple ports and an electrical connector for electrically coupling to a port, in accordance with an embodiment of the present invention. Power strip 100 includes body 102 with outlet cable 104, master switch 106, and ports 108A, 108B, 108C, and 108D, where outlet cable 104 supplies power to each of port 108A, 108B, 108C, and 108D. Master switch 106 allows for current to flow from outlet cable 104 to each of port 108A, 108B, 108C, and 108D depending on an on/off position. Master switch 106 also includes a circuit breaker to protect devices electrically coupled to any of ports 108A, 108B, 108C, and 108D in the event of power surge at outlet cable 104. In this embodiment, each port 108 represents a NEMA 5-15 receptacle, commonly referred to as type-b electrical outlet, for providing current to an electrically coupled device. In other embodiments, each port 108 can be any type of receptacle for accepting an electrical connector, depending on standardize receptacle for a given geographical region and/or the type of power being supplied at the receptacle (e.g., 120V versus 220V). Port 108A, 108B, 108C, and 108D can each receive and electrically couple to electrical connector 110, where electrical connector 110 is insertable into any of port 108A, 108B, 108C, and 108D and supplies power to a device via device cable 112. Connector body 114 of electrical connector 110 includes communication transmitter 116 and prongs 118, where prongs 118 are insertable into any of port 108A, 108B, 108C, and 108D on body 102 of power strip 100.

Each port 108A, 108B, 108C, and 108D respectively includes communication receiver 120A, 120B, 120C, and 120D for receiving a signal from communication transmitter 116 of electrical connector 110. Communication transmitter 116 and communication receiver 120 utilize near-field communication (NFC) to provide a channel of communication between electrical connector 110 and power strip 100. Each port 108A, 108B, 108C, and 108D respectively includes display 122A, 122B, 122C, and 122D for displaying identification information for a device electrically coupled to each of the respective ports 108. In this embodiment, each display 122A, 122B, 122C, and 122D is an electronic ink (e-ink) display capable of receiving a brief interval of current to display identification information for the device as prongs 118 of electrical connector 110 electrically couple to any of port 108A, 108B, 108C, and 108D. In other embodiments, each display 122A, 122B, 122C, and 122D represents any type of electronic display capable of providing identification information for an electrically coupled device.

Figure 2A:
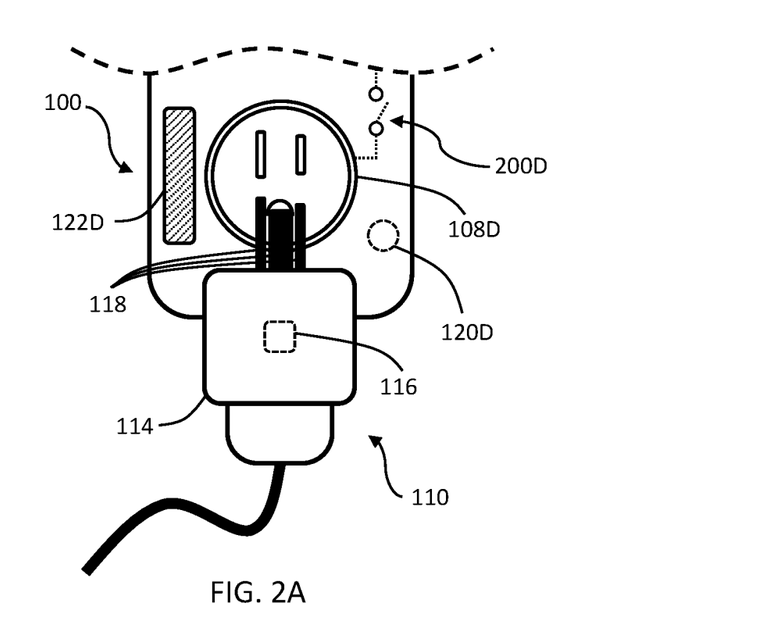
FIG. 2A depicts a top view of a power strip with multiple ports and an electrical connector prior to electrically coupling to a port, in accordance with an embodiment of the present invention.

FIG. 2A depicts a top view of a power strip with multiple ports and an electrical connector prior to electrically coupling to a port, in accordance with an embodiment of the present invention. In this embodiment, electrical connector 110 is moved into position for insertion into port 108D, where prongs 118 on body 114 of electrical connector 110 are to be electrically coupled to port 108D. Communication transmitter 116 of electrical connector 110 does not establish a signal channel with communication receiver 120D associated with port 108D until prongs 118 of body 114 electrically couple to port 108D. In other embodiments, power strip 100 includes a communication transmitter associated with port 108D capable of energizing a chip in body 114 of electrical connector 110 with identification information for a device. Current supplied to power strip 100 provides power to the communication transmitter associated with port 108D, energizes the chip in body 114 upon approaching a threshold distance, and reads identification information from the chip for the device, prior to prongs 118 electrically coupling to port 108D on power strip 100.

Power strip 100 can include dedicated current switches 200 for each port 108, where current is supplied to the electrically coupled device subsequent to receiving identification information for the device and verifying, via programmable control logic, that the device is authorized to electrically couple to power strip 100 (e.g., at port 108D) according to pre-established security protocols. Switch 200D for port 108D can remain in an open position until the programmable control logic verifies the device with electrical connector 110 attempting to electrically couple at port 108D. The programmable control logic can close switch 200D upon verification of the device with electrical connector 110. In some embodiments, power strip 100 can utilize switches 200 to prevent current flow to a specific port and subsequently, to a device electrically coupled at the specific port 108, where a shape and/or size of electrical connector 110 can interfere with another port 108 on power strip 1-0 and/or with master switch 106 (from FIG. 1) and/or prevent electrical connector 110 from being properly seated into the specific port 108. For example, if electrical connector 110 is inserted into port 108A (from FIG. 1) and programmable control logic determines that port 108D is more suitable for electrical connector 110 due to possible contact interference with master switch 106, the programmable control logic prevents switch 200A (not illustrated in FIG. 2A) from closing and displays an indicator in display 122D to identify associated port 108D as being more suitable for electrical connector 110 compared to port 108A.

Figure 2B:
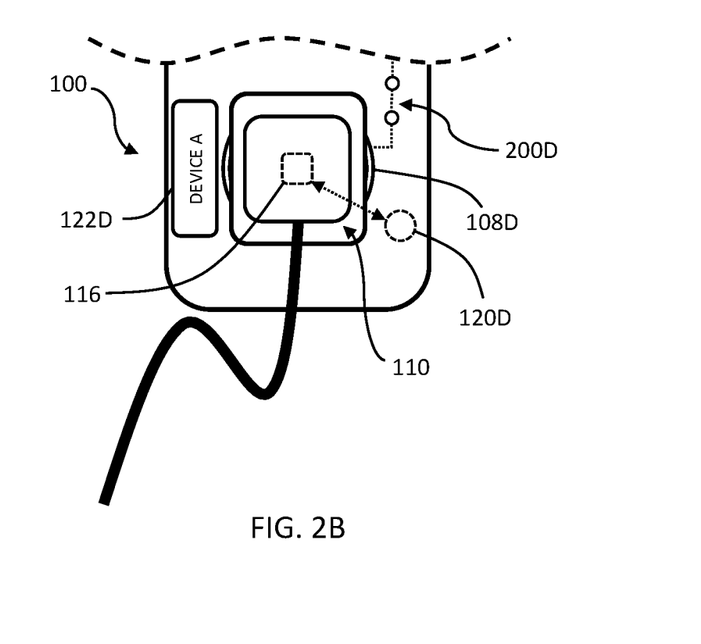
FIG. 2B depicts a top view of a power strip with multiple ports and an electrical connector electrically coupled to a port with displayed identification information for a device associated with the electrical connector, in accordance with an embodiment of the present invention.

FIG. 2B depicts a top view of a power strip with multiple ports and an electrical connector electrically coupled to a port with displayed identification information for a device associated with the electrical connector, in accordance with an embodiment of the present invention. As electrical connector 110 is inserted into port 108D, communication transmitter 116 and communication receiver 120 temporarily power on to relay identification information for a device associated with electrical connector 110. The identification information passed between communication transmitter 116 and communication receiver 120D for the device is displayed in display 122D (i.e., "Device A"). Subsequent to the identification information passing between communication transmitter 116 and communication receiver 120D, communication transmitter 116, communication receiver 120D, and display 122D revert to a standby phase. For embodiments utilizing switch 200D for managing current flow, programmable control logic verifies the device based on the identification information and the port in which electrical connector 110 is positioned. Subsequent to verifying that electrical connector 110 is properly positioned at the correct port (i.e., port 108D), the programmable control logic closes switch 200D and allows for current to flow to electrical connector 110.

Figure 2C:
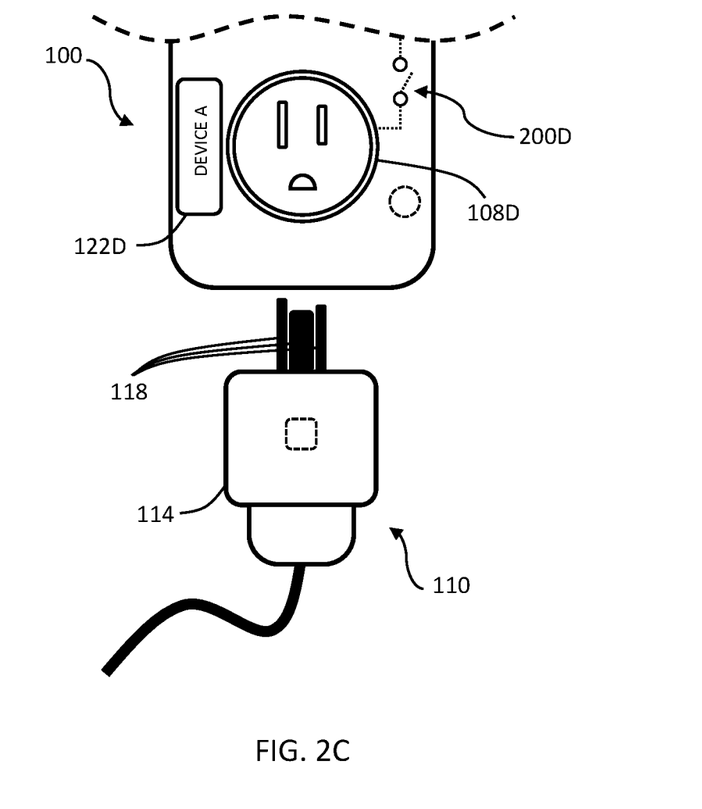
FIG. 2C depicts a top view of a power strip with multiple ports and an electrical connector electrically decoupled from a port with displayed identification information for a device associated with the electrical connector, in accordance with an embodiment of the present invention.

FIG. 2C depicts a top view of a power strip with multiple ports and an electrical connector electrically decoupled from a port with displayed identification information for a device associated with the electrical connector, in accordance with an embodiment of the present invention. In this embodiment, electrical connector 110 is removed from port 108D, where prongs 118 on body 114 of electrical connector 110 are electrically decoupled from port 108D. As mentioned above with regards to FIG. 1, display 122D can be an electronic ink (e-ink) display, where no constant current is required to display the identification information for the device with electrically decoupled electrical connector 110. Therefore, once electrical connector 110 electrically decouples from port 108D on power strip 100, display 122D can continue to display identification information for the device and a user has a visual indicator on power strip 100 for a position of electrical connector 110 for subsequent electrical coupling. In another embodiment, current is constantly supplied to display 122D to display the identification information for the device previously electrically coupled at port 108D. Power strip 100 can continue to display the identification information for the previously electrically coupled device until power strip 100 is reset (e.g., user reset, time-based reset) or until another device is electrically coupled at port 108D and identification information for the other device is displayed in display 122D. In yet another embodiment, display 122D ceases to display identification information for the device with electrical connector 110 as soon as electrical connector 110 electrically decouples from port 108D on power strip 100. For embodiments utilizing switch 200D, program control logic opens switch 200D subsequent to electrical connector 110 electrically decoupling from port 108D, thus requiring a new verification process for subsequent electrical couplings and closing of switch 200D.

It is to be noted, the above-mentioned embodiments are not limited to 3-prong based electrical cables and can include various other types of cables known in the art commonly found in datacenters, including but not limited to, ethernet cables, coaxial cables, fiber optic cables, and power distribution unit (PDU) cables. Furthermore, the above-mentioned embodiments are not limited to near-field communication for relaying identification information between a device and a port with an associated display. For example, subsequent to a device with a connector electrically coupling to a port and powering on, the device performs an initial program load (IPL) and sends identification information via a power-line communications to the port to present the identification information in an associated display. The device utilizes a data packet to send the identification information, which can also provide an operational status for presentation in the associated display. Utilizing power-line communications eliminates a requirement of an electrical connector and port combination having an NFC transmitter and an NFC receiver combination, thus utilizing existing hardware for relaying and presenting the identification information for the device in the associated display.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 3:
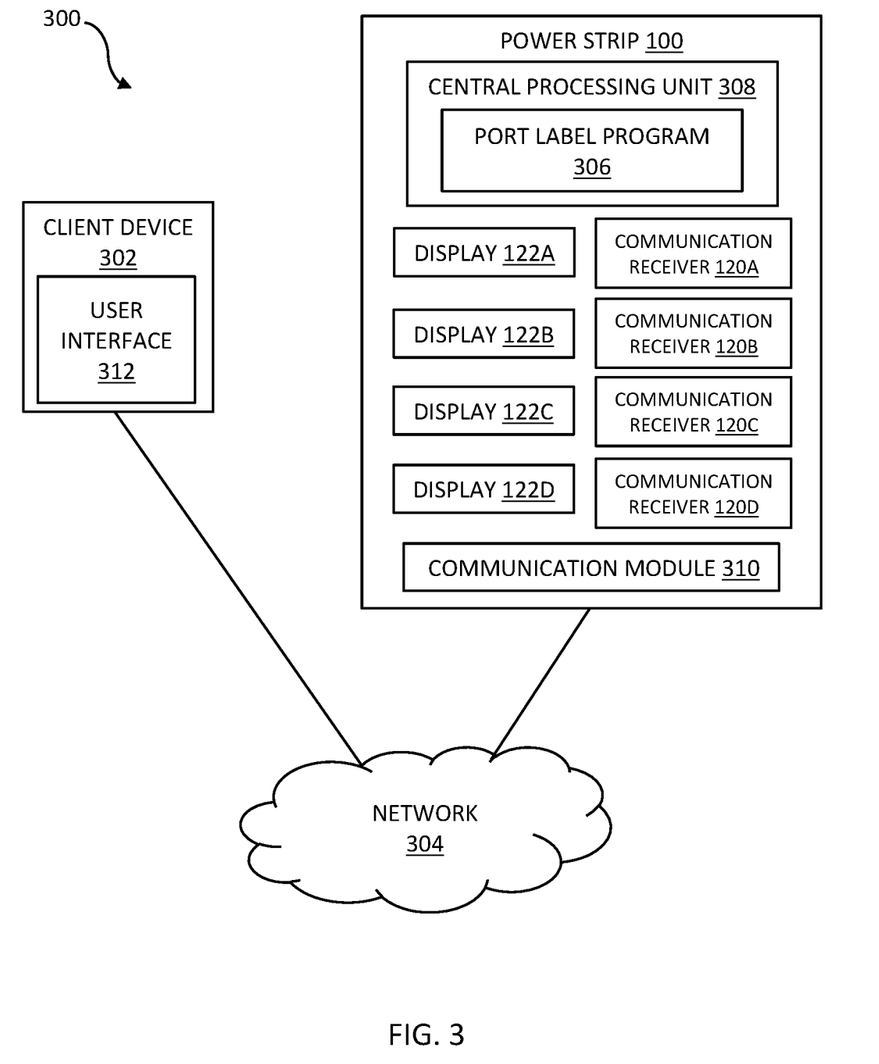
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used herein describes a computer system that includes multiple, physically distinct devices that operate together as a single computer system. FIG. 3 provides only an illustration of one implementation and does not imply any limitations with regards to the environments in which different embodiments may be implemented. Many modifications to the depicted environment may be made by those skilled in the art without departing from the scope of the invention as recited by the claims.

Distributed data processing environment 300 includes power strip 100 and client device 302 interconnected over network 304. As previously discussed with regards to FIGS. 1, 2A, 2B, and 2C, power strip 100 includes display 122A, 122B, 122C, and 122D, communication receiver 120A, 120B, 120C, and 120D, each associated with respective port 108A, 108B, 108C, and 108D (not illustrated in FIG. 3).

Power strip 100 includes programmable control logic in the form of port label program 306 operating on central processing unit 308. Port label program 306 manages power distribution for power strip 100, along with identification information for each port on power strip 100. Port label program 306 initializes logic to provide port naming on power strip 402 via display 122A, 122B, 122C, and 122D. Port label program 306 determines a device is electrically coupled to a port on power strip 100 and establishes a communication with the device to verify whether the device is authorized to utilize the port and to obtain identification information for the device for displaying on one of display 122A, 122B, 122C, and 122D on power strip 100. Port label program 306 determines whether identification information is available for the device attempting to receive power via power strip 100. In the event port label program 306 determines there is no identification information available for the device attempting to receive power via power strip 100, port label program 306 determines whether an account for configuring power strip 100 is available. In the event port label program 306 determines an account for configuring power strip 100 is not available, port label program 306 displays default identification information on the port on power strip 100 to which the device is electrically coupled. In the event port label program 306 determines there is identification information available for the device attempting to receive power via power strip 100, port label program 306 receives identification for the device and displays the identification on the port on power strip 100 to which the device is electrically coupled.

Client device 302 may be a cellphone, smartphone, smartwatch, laptop, tablet computer, or any other electronic device capable of communicating via network 304. In general, client device 302 represents one or more programmable electronic devices or combination of programmable electronic devices capable of executing machine readable program instructions and communicating with other computing devices (not shown) within distributed data processing environment via a network, such as network 304. In one embodiment, client device 302 represents one or more devices associated with a user who is an owner or administrative user of power strip 100. Client device 302 includes user interface 312, where user interface 312 enables a user of client device 302 to interact with outlet label program 206 on power strip 100.

In general, network 304 can be any combination of connections and protocols that will support communications between communication module 310 on power strip 100 and client device 302. Network 304 can include, for example, a local area network (LAN), a wide area network (WAN), such as the internet, a cellular network, a Bluetooth® connection or any combination of the preceding, and can further include wired, wireless, and/or fiber optic connections. In one embodiment, outlet label program 306 can be a web service accessible via network 304 to a user of client device 302. In another embodiment, outlet label program 306 may be operated directly by a user of power strip 100 via user interface (not illustrated in FIG. 3).

Figure 4:
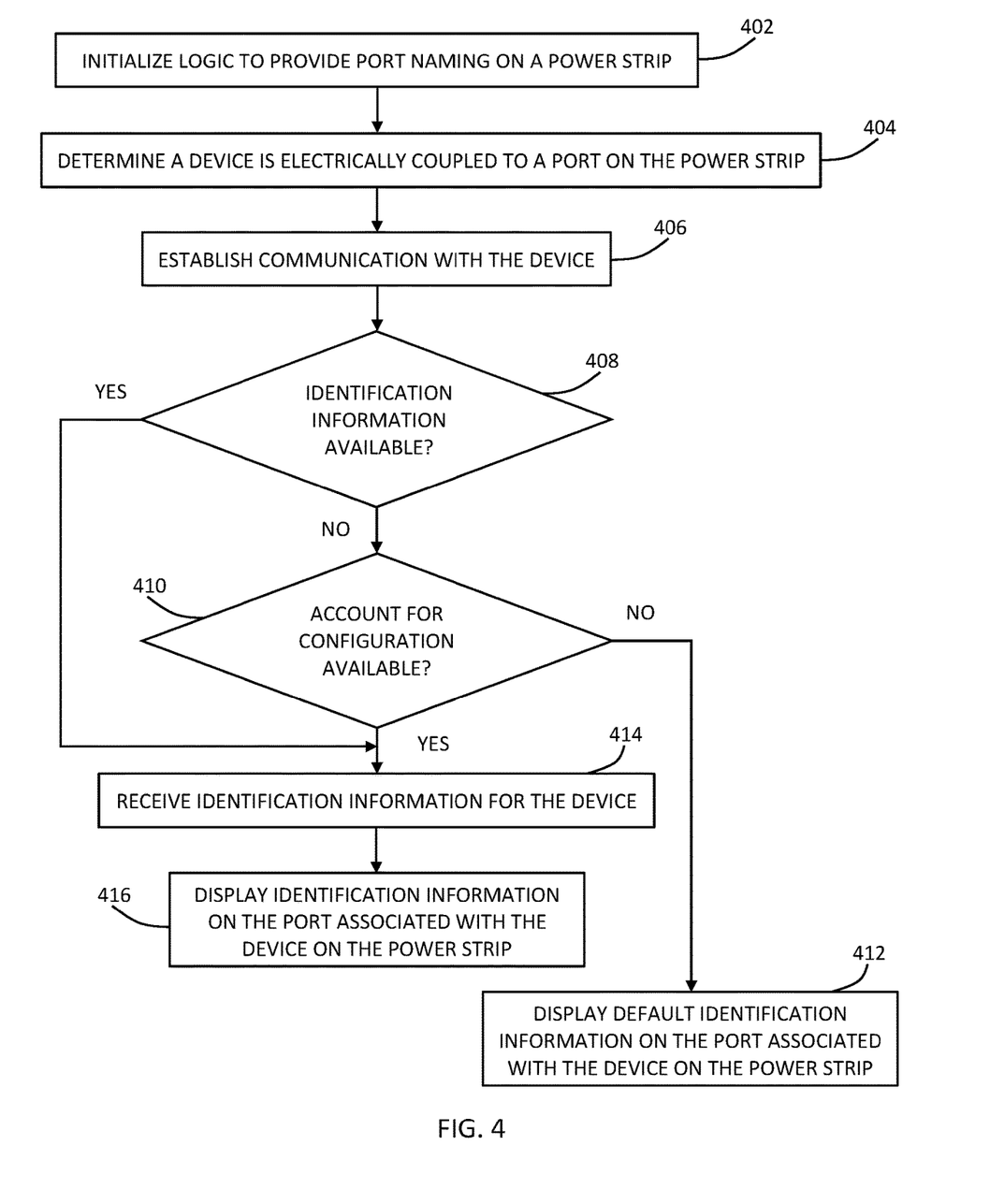
FIG. 4 is a flowchart depicting operational steps of a port label program for displaying identification information for device electrically coupled to a power strip, in accordance with one embodiment of the present invention.

FIG. 4 is a flowchart depicting operational steps of a port label program for displaying identification information for device electrically coupled to a power strip, in accordance with one embodiment of the present invention.

Port label program 306 initializes logic to provide port naming on a power strip (402). In this embodiment, subsequent to a power cable for the power strip being electrically coupled to a wall outlet receptacle and a master switch positioned in an 'on' position, port label program 306 initializes logic to provide port naming for each port on the power strip. Details regarding the power cable, the master switch, and the ports on the power strip are discussed in detail above with regards to FIG. 1, 2A, 2B, and 2C. Port label program 306 determines a device is electrically coupled to a port on the power strip (404). In one embodiment, port label program 306 determines the device is electrically coupled to a port on the power strip subsequent to current flowing from the port on the power strip and a communication receiver on an electrical connector of the device powering on. In another embodiment, port label program 306 determines the device is electrically coupled to the port on the power strip based on a signal channel established via NFC between a communication receiver and a communication transmitter between the power strip and an electrical connector of the device. It is to be noted, in some embodiments electrically coupled indicates an electrical connection is present but current is not present.

Port label program 306 establishes communication with the device (406). In one embodiment, port label program 306 establishes a signal channel for communication with the device subsequent to current flowing between the port and the electrical connector for the device. Port label program 306 establishes the signal channel for communication utilizing an NFC receiver on the power strip and an NFC transmitter on the electrical connector for the device. In another embodiment, port label program 306 establishes a signal channel for communication with the prior to current flowing between the port and the electrical connector for the device. Port label program 306 establishes the signal channel for communication by supplying current to a communication transmitter associated with the port on the power strip with the electrically coupled device, energizing a chip on the electrical connector for the device, and reading identification information from the chip for the device.

Port label program 306 determines whether identification information is available for the device (decision 408). In this embodiment, identification information for the device includes a device name for presenting in a display associated with the port on the power strip. The device name can be a default manufacturer supplied name or an administrative user configured name via an associated account. In some embodiments, identification information for the device can include dimensions for the electrical connector for the device and manufacturer provided recommendations for placement of the electrical connector for the device. In the event port label program 306 determines identification information is not available for the device ("no" branch, decision 408), port label program 306 determines whether an account for configuration is available (decision 410). In the event port label program 306 determines identification information is available for the device ("no" branch, decision 408), port label program 306 receives identification information for the device 414.

Port label program 306 determines whether an account for configuration is available (decision 410). In the event port label program 306 determines an account for configuration is available ("yes" branch, decision 410), port label program 306 receives identification information for the device (414). In the event port label program 306 determines an account for configuration is not available ("no" branch, decision 410), port label program 306 displays default identification information on the port associated with the device on the power strip. In one embodiment, the default identification information can include a generic name with numerical and/or alphabetical values, such as, "Device A" or "Device 1" for presenting in the display associated with the port providing current to the electrical connector for the device. In another embodiments, the default identification information can include a manufacturer supplied name for presenting in the display associated with the port providing current to the electrical connector for the device. For example, if a computer device manufactured by company "ABC" and includes model number "D100" is electrically coupled to the port, port label program 306 presents "ABC D100" in the display associated with the port providing current to the electrical connector for the computer device.

Port label program 306 receives identification information for the device (414). In one embodiment, port label program 306 receives the identification information from a communication transmitter on the electrical connector via a communication transmitter integrated into the power strip. In some embodiments, port label program 306 can utilize the identification information to perform one or more verifications to determine whether the device is authorized to receive current for powering the device, subsequent to electrically coupling to the power strip. In one example, port label program 306 performs a verification of the device based on the received identification information by determining whether the device is authorized to utilize the power strip (i.e., any of the ports). In the event port label program 306 determines the device is not authorized (i.e., failed verification) to utilize the power strip based on the received identification information, port label program 306 restricts, via a switch, current flow to the port to which the device is electrically coupled. In the event port label program 306 determines the device is authorized to utilize the power strip based on the received identification information, port label program 306 opens, via a switch, current flow to the port to which the device is electrically coupled.

Port label program 306 can also utilize the identification to determine whether the current port is optimal for placement of the electrical connector for the device or if another port is better suited for the electrical connector. If port label program 306 determines the device includes an electrical connecter with an integrated transformer based on the identification information, port label program 306 can prevent current flow to a port whether placement of the electrical connector can interfere with another port and/or a master switch that can prevent improper seating of the electrical connector in the port. Port label program 306 can display the identification information on another port for repositioning on the power strip, discussed in further detail with regards to (416). In one example, port label program 306 performs a verification of the device based on the received identification information by determining whether the device is authorized to utilize the specific port on the power strip to which the device is electrically coupled. In the event port label program 306 determines the device is not authorized to utilize the specific port based on the received identification information, port label program 306 restricts, via a switch, current flow to the port to which the device is electrically coupled and displays an indicator in a display associated with another port where the device is authorized to utilize. In the event port label program 306 determines the device is authorized to utilize the specific port based on the received identification information, port label program 306 opens, via a switch, current flow to the port to which the device is electrically coupled.

Port label program 306 displays identification information on the port associated with the device on the power strip (416). In one embodiment, port label program 306 displays the identification information on the port associated with the device on the power strip, where display is an electronic ink display capable of receiving a brief interval of current and displaying identification information (e.g., "Device A"). For electronic ink displays, a constant current is not required to continue displaying the identification information for the device electrically coupled to the port on the power strip. In another embodiment, port label program 306 displays the identification information on the port associated with the device on the power strip, where the display is a liquid-crystal display (LCD) panel requiring a constant current to display the identification information for the electrically coupled device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a first device is electrically coupled to a first port out of a plurality of ports;
   establishing communications between a first communication transmitter on a first electrical connector for the first device and a first communication receiver associated with the first port;
   responsive to determining first identification information is available for the first device, receiving, from the first communication transmitter, at the first communication receiver the first identification information for the device; and
   displaying, in a first display, the first identification information for the first device, wherein the first display is associated with the first port.

2. The method of claim 1, wherein the first display is an electronic ink display.

3. The method of claim 2, further comprising:
   determining a second device is electrically coupled to a second port out of the plurality of ports;
   establishing communications between a second communication transmitter on a second electrical connector for the second device and a second communication receiver associated with the second port; and
   responsive to determining second identification information is not available for the second device, determining whether an account for configuration is available for the second device.

4. The method of claim 3, further comprising:
   responsive to determining the account for configuration is not available for the second device, displaying, in a second display, default identification information for the second device, wherein the second display is associated with the second port.

5. The method of claim 4, wherein the second display is another electronic ink display.

6. The method of claim 3, further comprising:
   responsive to determining the account for configuration is available for the second device, receiving, via a communication module, the second identification information for the second device from a client device.

7. The method of claim 6, further comprising:
   displaying, in a second display, the second identification information for the second device, wherein the second display is associated with the second port.

8. The method of claim 7, wherein the second display is another electronic ink display.

9. The method of claim 2, further comprising:
   determining a second device is electrically coupled to a second port out of the plurality of ports;
   establishing communications between a second communication transmitter on a second electrical connector for the second device and a second communication receiver is associated with the second port;
   responsive to determining second identification information is available for the second device, receiving, from the second communication transmitter, at the second communication receiver the second identification information for the second device;
   performing a verification of the second device based on the second identification information, wherein the verification manages current flow to the second port.

10. The method of claim 9, wherein performing the verification of the second device further comprises:
    determining whether the second device is authorized to utilize the plurality of ports; and
    responsive to determining the second device is not authorized to utilize the plurality of ports, restricting, via a switch, current flow to the second port.

11. The method of claim 9, wherein performing the verification of the second device further comprises:
    determining whether the second device is authorized to utilize the plurality of ports; and
    responsive to determining the second device is authorized to utilize the plurality of ports, opening, via a switch, current flow to the second port.

12. The method of claim 9, wherein performing the verification of the second device further comprises:
    determining whether the second device is authorized to utilize the second port; and
    responsive to determining the second device is not authorized to utilize the plurality of ports, restricting, via a switch, current flow to the second port.

13. The method of claim 12, further comprising:
    identifying a third port from the plurality of ports for the second device.

14. The method of claim 13, further comprising:
    displaying, in a third display, an indicator for placement of the second electrical connector for the second device, wherein the third display is associated with the third port and a third communication receiver.

15. A system comprising:
    a first communication receiver, a first display, and a first port configured to provide electrical current to a first electrically coupled device; and
    a first electrical connector for the first electrically coupled device with a first communication transmitter configured to transmit first identification information for the first electrically coupled device to the first communication receiver for presentation in the first display.

16. The system of claim 15, further comprising:
    a second communication receiver, a second display, and a second port configured to provide electrical current to a second electrically coupled device; and
    a second electrical connector for the first electrically coupled device with a second communication transmitter configured to transmit second identification information for the second electrically coupled device to the second communication receiver for presentation in the first display, wherein the first identification information is different compared to the second identification information.

17. The system of claim 16, wherein the first display and the second display are each an electronic ink display.

18. The system of claim 17, wherein the first display is configured to present identification information for the first electrically coupled device subsequent to electrical decoupling.

19. The system of claim 15, further comprising:
a first switch with control logic configured to manage current flow to the first electrically coupled device via the first port based on a verification of the first identification information.

20. The system of claim 19, where the first switch with the control logic is further configured to prevent current flow to the first electrically coupled device via the first port based on a failed verification of the first identification information.

* * * * *